United States Patent
Baldwin, Jr. et al.

(10) Patent No.: US 8,048,185 B2
(45) Date of Patent: Nov. 1, 2011

(54) DIESEL PARTICULATE FILTER ASSEMBLY

(75) Inventors: Donald W. Baldwin, Jr., Perrysburg, OH (US); Steve M. Butsch, Maumee, OH (US); Bradley R. Postage, Findlay, OH (US)

(73) Assignee: Fram Group IP LLC, Danbury, CT (US)

(*) Notice: Subject to any disclaimer, the term of this patent is extended or adjusted under 35 U.S.C. 154(b) by 581 days.

(21) Appl. No.: 12/062,197

(22) Filed: Apr. 3, 2008

(65) Prior Publication Data

US 2008/0245234 A1    Oct. 9, 2008

Related U.S. Application Data

(60) Provisional application No. 60/910,165, filed on Apr. 4, 2007.

(51) Int. Cl.
*B01D 46/00* (2006.01)

(52) U.S. Cl. .......... 55/483; 55/484; 55/523; 55/DIG. 30

(58) Field of Classification Search ............ 55/483–488, 55/522–524; 422/168–172, 177–182
See application file for complete search history.

(56) References Cited

U.S. PATENT DOCUMENTS

| | | | | |
|---|---|---|---|---|
| 1,049,789 | A | * | 1/1913 | Williamson .................. 55/484 |
| 2,220,127 | A | * | 11/1940 | Slayter ........................ 55/485 |
| 2,857,017 | A | * | 10/1958 | Nutting ........................ 55/500 |
| 2,966,959 | A | * | 1/1961 | Neumann ..................... 55/484 |
| 3,154,388 | A | * | 10/1964 | Purse .......................... 422/179 |
| 3,479,145 | A | * | 11/1969 | Lentz ........................... 422/181 |
| 3,874,854 | A | * | 4/1975 | Hunter, Jr. .................... 422/175 |
| 3,989,471 | A | * | 11/1976 | Nowak ......................... 422/179 |
| 4,315,455 | A | * | 2/1982 | Shaklee ........................ 454/260 |
| 4,818,257 | A | * | 4/1989 | Kennedy et al. ............... 95/286 |
| 4,838,903 | A | * | 6/1989 | Thomaides et al. ............ 95/286 |
| 4,873,069 | A | | 10/1989 | Weaver et al. |
| 5,034,023 | A | * | 7/1991 | Thompson ................... 205/634 |
| 5,087,272 | A | | 2/1992 | Nixdorf |
| 5,171,342 | A | * | 12/1992 | Trefz ............................ 55/487 |
| 5,176,727 | A | * | 1/1993 | Ezaki et al. ................... 55/523 |
| 5,250,094 | A | * | 10/1993 | Chung et al. .................. 55/523 |
| 5,500,029 | A | * | 3/1996 | Zievers et al. ................. 55/485 |
| 5,797,975 | A | * | 8/1998 | Davis ............................ 55/493 |
| 6,146,451 | A | * | 11/2000 | Sakata et al. .................. 96/135 |
| 6,325,834 | B1 | | 12/2001 | Fonseca |

(Continued)

FOREIGN PATENT DOCUMENTS

WO    2005003528 A1    1/2005

OTHER PUBLICATIONS

International Search Report dated Sep. 24, 2008 for International Application No. PCT/US2008/059264, International Filing Date Apr. 3, 2008.

(Continued)

*Primary Examiner* — Duane Smith
*Assistant Examiner* — Amber Orlando
(74) *Attorney, Agent, or Firm* — Cantor Colburn LLP

(57) ABSTRACT

A filter assembly configured to be incorporated into an exhaust treatment device, the filter assembly comprising: a plurality of channel frames secured to each other, each channel frame defining a perimeter for supporting a filter element, the perimeter surrounding a portion of the filter element.

6 Claims, 6 Drawing Sheets

U.S. PATENT DOCUMENTS

| | | | |
|---|---|---|---|
| 6,352,578 B1 * | 3/2002 | Sakata et al. | 96/134 |
| 6,485,546 B2 * | 11/2002 | Fuchs | 96/135 |
| 6,913,059 B2 | 7/2005 | Nixdorf | |
| 6,974,490 B2 * | 12/2005 | Gillingham et al. | 55/486 |
| 2001/0043891 A1 | 11/2001 | Adiletta | |
| 2007/0084167 A1 * | 4/2007 | Ticknor | 55/484 |
| 2007/0084168 A1 * | 4/2007 | Ashwood et al. | 55/486 |

OTHER PUBLICATIONS

Written Opinion dated Sep. 24, 2008 for International Application No. PCT/US2008/059264, International Filing Date Apr. 3, 2008.

* cited by examiner

DIESEL PARTICULATE FILTER ASSEMBLY

CROSS REFERENCE TO RELATED APPLICATIONS

The application claims the benefit of U.S. Provisional application Ser. No. 60/910,165, filed Apr. 4, 2007, the contents of which are incorporated herein by reference thereto.

BACKGROUND

The present invention relates to particulate filters for diesel exhaust systems. More particularly, the present invention relates to particulate filter assemblies that can be incorporated into diesel exhaust treatment devices.

Because regulatory agencies have recently mandated the reduction of particulate emissions in diesel engines, there has been increased activity in the development of diesel particulate filters, that is, exhaust emission filters for diesel engines. The role of a typical diesel particulate filter is to trap and remove the particulate components of the diesel exhaust stream, which include diesel soot and aerosols such as ash particulates, metallic abrasion particles, sulfates, and silicates, to prevent their discharge from the tailpipe.

Diesel particulate filters (DPF) should provide long-term operation without diminishing the filtration efficiency of the filter and performance of the engine. Factors related to the performance of diesel particulate filters include but are not limited to high temperatures (e.g., up to 1400° C.), capability to store soot and ash, pressure loss, low thermal mass, stability, and durability. In addition, manufacturing costs and assembly volume are important considerations.

The filtration is achieved by a porous structure (e.g., filter media) that allows transmission of the fluid phase but stops or captures diesel particulate matter larger than a threshold particle size. Variations in the filter's efficiency are a function of the pore size of the filter media and particle size of the diesel particulate matter thus, every filter has a finite capacity, and as the flow through a diesel particulate filter decreases exhaust backpressure increases, which in some instances is undesirable. Due to the low bulk density of diesel particulates, diesel particulate filters can quickly accumulate load on the engine, the trapped particulate material is burned from the filter by continuous or periodic oxidation in the process of regeneration.

Accordingly, it is desirable to provide a filter assembly that can vary in geometry and is capable of having accumulated particles removed therefrom.

SUMMARY OF THE INVENTION

In one exemplary embodiment, a filter assembly configured to be incorporated into an exhaust treatment device is provided. The filter assembly generally includes a plurality of channel frames secured to each other each channel frame defining a perimeter for supporting a filter element, the perimeter surrounding a portion of the filter element.

In another exemplary embodiment, a filter assembly configured to be incorporated within a housing of an exhaust treatment device is provided. The filter assembly generally includes a first end disk and a second end disk; a filter element secured to the first end disk and the second end disk, the second end disk being secured to a portion of the housing; and a connector secured to the housing at one end and slideably received within a collar secured to the first end disk, the filter element being capable of expansion and contraction as the first end disk slides with respect to the connector.

In another exemplary embodiment, a filter assembly configured to be incorporated into an exhaust treatment device is provided. The filter assembly generally includes a rack having a plurality of frames each of which define a perimeter for removably receiving a filter media therein, the filter media being removably sealed to the perimeter by a sealing material.

DETAILED DESCRIPTION OF EXEMPLARY EMBODIMENTS

Exemplary embodiments of filter assemblies in accordance with the present invention will now be described with reference to the drawings. The exemplary filter assemblies described herein are configured to be incorporated within housing canisters to form exhaust treatment devices that are in fluid connection with the exhaust gas pipes of a diesel engine. As opposed to conventional wall-flow filter assemblies, the exemplary filter assemblies described herein can be modified for incorporation into housing canisters of many varying dimensions and applications, some of which are described in detail below. Thus, when a filter assembly is incorporated in this manner, exhaust emissions that are discharged from a diesel engine to flow through the exhaust pipe are directed across the filter assembly so that particulates contained in the exhaust emissions are collected by a filter media disposed within the filter assembly. In one non-limiting exemplary embodiment, the filter media is pleated to increase filtration area. In one exemplary embodiment the collected particulates can then be heated and incinerated to regenerate the filter assembly using one of several known techniques.

In another exemplary embodiment and as will be discussed herein the filter assembly is capable of being disassembled and the collected particulates are blown out or sucked from the filter media.

Figure 1:
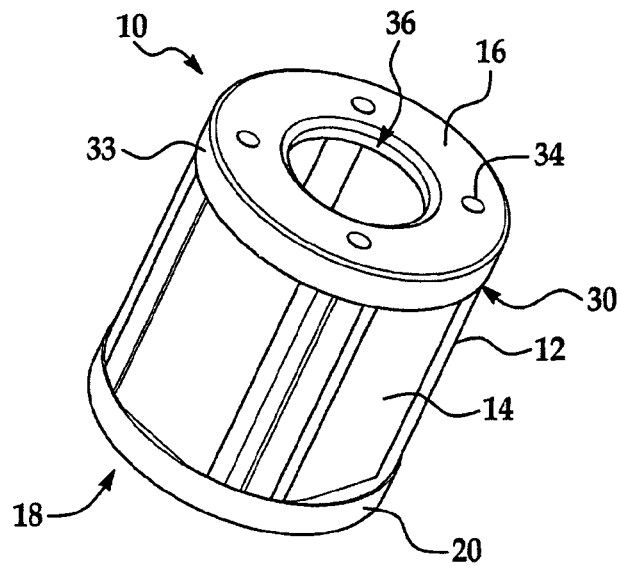
FIGS. 1-2 are cross-sectional views of an exemplary embodiment of a filter assembly in accordance with an exemplary embodiment of the present invention.
Figure 2:
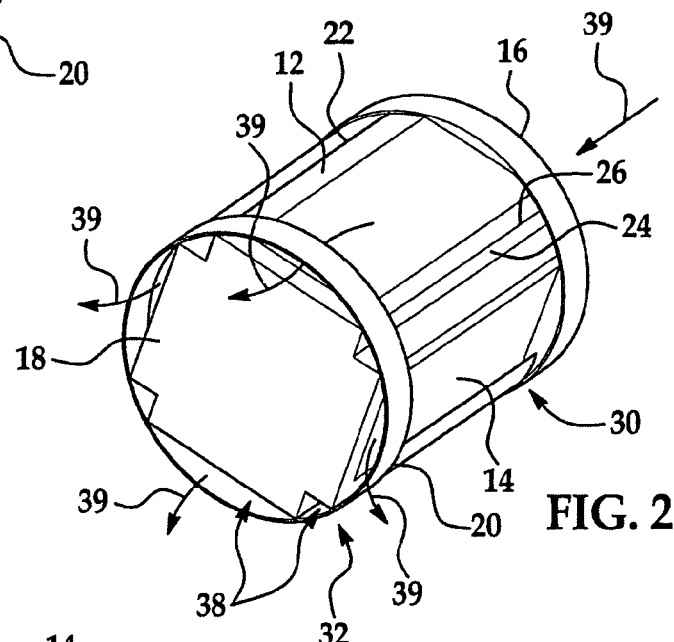

In accordance with an exemplary embodiment of the present invention, a filter assembly that can be configured to be incorporated into an exhaust treatment device is illustrated in FIGS. 1 and 2. As will be apparent from the descriptions and figures below, filter assembly 10 is configured to provide a means to package flat panel filters in a circular design space of a diesel engine (e.g. within a circular exhaust pipe or exhaust line) and secure the filters in the flow stream of the exhaust emissions generated from the diesel engine. It is also contemplated that the filter assembly may be incorporated into a differently shaped design space such as oval, spherical, round, oblong or otherwise.

Referring to FIGS. 1 and 2, filter assembly 10 has a plurality of c-shaped or u-shaped channel frames 12 each supporting a filter element 14, which is configured to remove particulate matter from an exhaust flow. The plurality of c-shaped channel frames 12 are supported by an entry cap 16, an end plate 18, and an exit band 20, thus forming filter assembly 10.

In one non-limiting exemplary embodiment, filter element 14 is slid into an open end of the frames and supported by a perimeter of one of the c-shaped channel frames 12. The filter element 14 comprises a ceramic fiber material, which in accordance with a non-limiting exemplary embodiment of the present invention, is selected from the group consisting of silicon carbide, silicon nitride, cordierite, aluminum oxide, alumina silicate, and combinations thereof. In accordance with another exemplary embodiment, the filter media may be formed by the methods of U.S. Pat. No. 6,913,059 the contents of which are incorporated herein by reference thereto. Following formation of the ceramic fiber based web, the fibers can be treated with a binder assist agent, dried, and at least partially bonded to neighboring fibers using the inorganic, preferably ceramic, binder. Each element can include multiple layers of filter media. The use of multiple media layers can increase the soot capacity of a filter element by overcoming the plugging that occurs in the top 20-30% of a single layer media, thereby enabling greater soot penetration and reducing regeneration frequency.

In accordance with an exemplary embodiment of the present invention, the plurality of c-shaped channel frames 12 are formed by a suitable metal, such as stainless steel. Of course, other suitable metals or non-metal materials can be used to form the plurality of c-shaped channel frames 12, such as, for example, ceramic material, which in accordance to one exemplary embodiment is formed by a ceramic injection molding or casting process.

Each of the plurality of c-shaped channel frames 12 includes a first side 22 and a second side 24 extending along a length of the filter assembly. In one exemplary embodiment, a peripheral edge of the first side 22 of one c-shaped channel frame 12 is mated to a peripheral edge of the second side 24 of another c-shaped channel frame 12 such that each c-shaped channel frame is connected to another c-shaped channel frame as shown. In the exemplary embodiment shown in FIGS. 1 and 2, four c-shaped channel frames 12 mated together are illustrated. It should be understood that more or less can be employed depending on the application and/or desired filter media area in an exemplary embodiment of the present invention.

The filter assembly may include a means for matting the plurality of c-shaped channel frames together. These means includes, but should not be limited to, a ceramic paste, a weld or any other known means. In one non-limiting embodiment, a sealing material 26 is disposed between the first side 22 of one c-shaped channel frame 12 and the second side 24 of another c-shaped channel frame 12 for securing the frames together. In accordance with an exemplary embodiment a non-limiting example of sealing material 26 is ceramic matting currently available from Unifrax or equivalents thereof. In accordance with an exemplary embodiment of the present invention, the sealing material 26 provides a means for sealing peripheral edges of the first side 22 and second side 24 of each frame with another corresponding first and second side of another frame.

Each of the plurality of c-shaped channel frames 12 includes a first end 30 and a second end 32. The first end 30 is configured to mate with an inner surface of an entry band 33 extending from entry cap 16 while the second end 32 is configured to mate with a surface portion of bottom plate 18 as shown using, for example, a sealing material, such as ceramic matting available from Unifrax or equivalents thereof. The entry band 33 can be, for example, round in shape. Examples of other shapes that can be utilized to form entry band 33 to meet a particular exhaust line design space can include oval, spherical, oblong, or otherwise.

In one exemplary embodiment, entry band 33 and entry cap 16 are two separate parts secured together using a suitable sealing material, such as, for example, ceramic matting available from Unifrax or equivalents thereof. In one-non limiting exemplary embodiment, the entry cap is circular in shape. Of course, other non-limiting shapes can be utilized to form entry cap 16 to meet a particular exhaust line design space, such as, oval, spherical, oblong, or otherwise. In one-non limiting exemplary embodiment, the entry band 33 is circular in shape. Of course, other non-limiting shapes can be utilized to form entry band 33 to meet a particular exhaust line design space, such as, oval, spherical, oblong, or otherwise. On one exemplary embodiment, the entry cap 16 and entry band 33 have similar shapes to facilitate ease in securing the two parts together. The entry cap 16 includes a plurality of openings 34 configured for receiving a fastening means (e.g. bolt) thereto for securing the plurality of c-shaped channel frames 12 to the entry cap 16. In one exemplary embodiment, the channel frames include openings (not shown) corresponding to openings 34 of entry cap 16 for receiving the fastening means thereto.

In one exemplary embodiment, entry cap 16 defines an inlet opening 36. The inlet opening 36 may have a substantially circular cross-section. It is also contemplated that the inlet may have a differently shaped cross-section such as oval, square, rectangular, triangular, or any other suitable cross-section shapes. The inlet opening 36 is selectively positioned in the exhaust gas path of the exhaust emissions for receiving the same. The inlet opening 36 can be of any diameter length depending on the application.

In one non-limiting exemplary embodiment, a suitable metal, such as stainless steel, forms entry band 33 and entry cap 16. Of course, other suitable metals or non-metal materials can be used to form entry band 33 and entry cap 16, such as, for example, ceramic material, which in accordance to one exemplary embodiment is formed by a ceramic injection molding or casting process.

The exit band 20 is secured to and surrounds a portion of second end 32 of each of the plurality of c-shaped channel frames 12. In one exemplary embodiment, exit band 20 is circular in shape. Of course, other non-limiting shapes can be utilized to form exit band 20 to meet a particular exhaust line design space, such as, oval, spherical, oblong, or otherwise. The filter assembly includes a plurality of exhaust pathways 38 defined between exit band 20 and plate 18 for receiving a byproduct of the exhaust emissions after each filter media 14 collects the particulates contained therein. Thus, incorporating filter assembly 10 into an exhaust treatment device provides an exhaust flow to flow into inlet 36, through each filter media 14 and out of the plurality of exhaust pathways 38. In other words, a plurality of fluid paths illustrated by arrow 39 provides a means for filtering fluid passing therethrough.

In one non-limiting exemplary embodiment, a suitable metal, such as stainless steel, forms exit band 20. Of course, other suitable metals or non-metal materials can be used to form exit band 20, such as, for example, ceramic material, which in accordance to one exemplary embodiment is formed by a ceramic injection molding or casting process.

It should be understood that components of filter assembly 10 such as, the c-shaped channel frames 12, entry band 33, entry cap 16, exit band 20, and end plate 18 can be manufactured by several means depending on the application requirements. For example, in high temperature requirements, one or more above-mentioned components forming filter assembly 10 can be made from ceramics, or high temperature resistant metal alloys, either cast or component built. In other embodiments, the one or more above-mentioned components can be produced via plastic components, or injection molded. In one embodiment, the above-mentioned components can be formed or molded together or separately formed and secured together by a suitable means, such as ceramic matting available from Unifrax or equivalents thereof.

Figure 3:
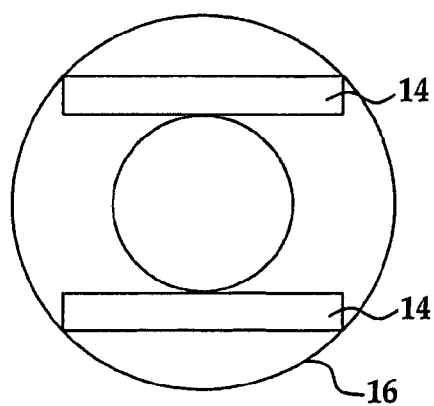
FIGS. 3-5 are top perspective views of examples of the various filter media areas being configured in the filter assembly for meeting a particular application in accordance with an exemplary embodiment of the present invention.
Figure 4:
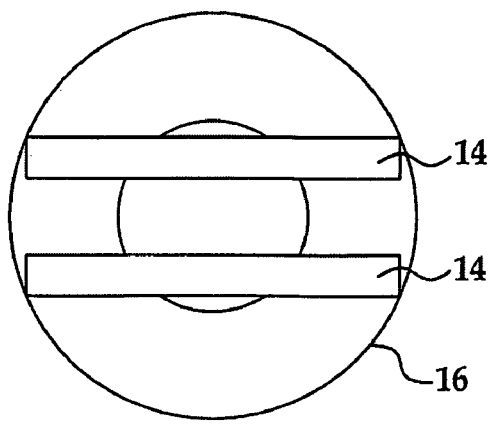
Figure 5:
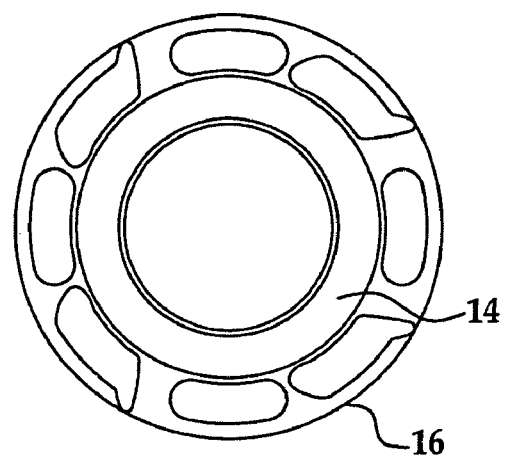

In accordance with an exemplary embodiment of the present invention, the number and configurations of the frames and filter elements illustrated in FIGS. 1-2 should be considered as non-limiting examples. It is contemplated that alternative exemplary embodiments of filter assembly 10 could, for instance, include any number of frames and filter elements having any number of configurations of the same. FIGS. 3-5 illustrate examples of alternative exemplary embodiments of the filter assembly that show various ways of providing various filter media area to meet a particular application. The number of frames, as well as their dimensions, can be varied and depend on the filtration, size, manufacturing, and other requirements of a particular application.

Accordingly, exemplary embodiments of filter assembly 10 of the present invention relate to means for effectively packaging flat panel filters in a circular design space and for effectively securing the filters in the flow stream of the exhaust emissions.

Figure 6:
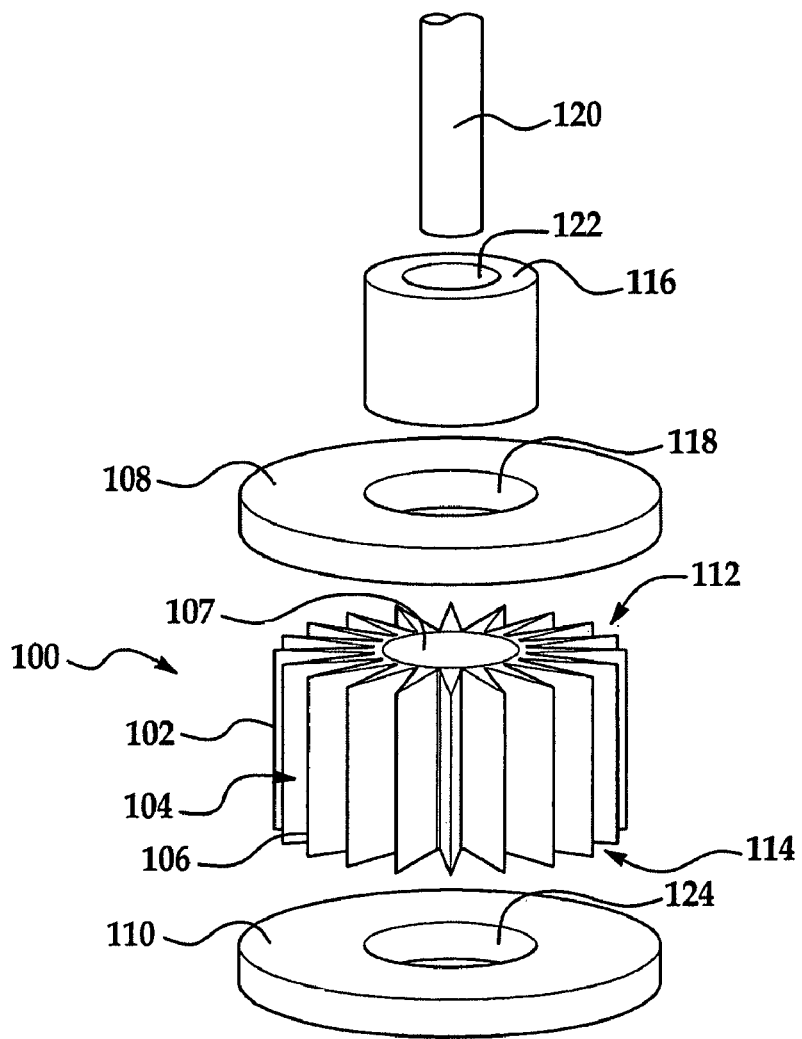
FIG. 6 is an exploded perspective view of an alternative exemplary embodiment of a filter assembly in accordance with an exemplary embodiment of the present invention.
Figure 7:
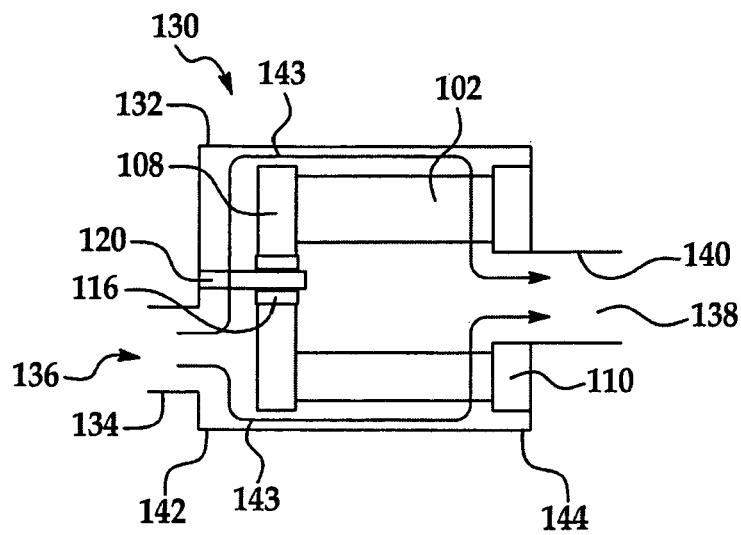
FIG. 7 is a cross-sectional view of the filter assembly of FIG. 6 being incorporated into an exhaust treatment device in accordance with an exemplary embodiment of the present invention.
Figure 8:
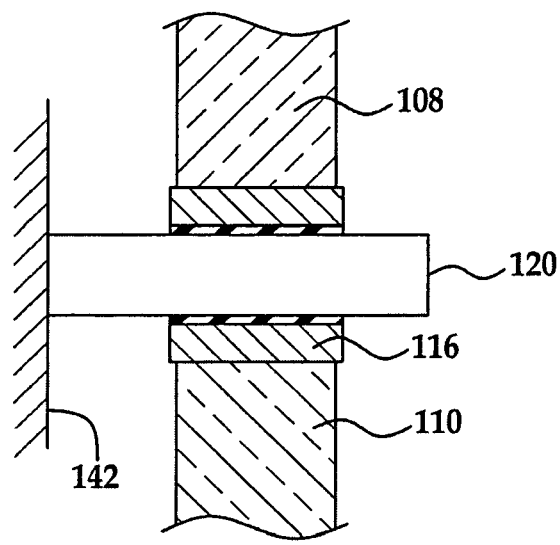
FIG. 8 is a cross-sectional view of a means for securing a filter element of the filter assembly of FIG. 6 to an outer can structure accordance with an exemplary embodiment of the present invention.

An alternative exemplary embodiment of a filter assembly in accordance with an exemplary embodiment of the present invention is illustrated in FIGS. 6-8. As shown, a filter assembly 100 configured to be incorporated into an exhaust treatment device is provided. Because of the coefficients of thermal expansion, as the diesel particulate filter increases in temperature, the dissimilar materials expand at different rates, causing possible issues in securing the filter element, namely reduced preload on the filter and surrounding matting material, ultimately resulting in a loss of engagement between filter and can, letting the filter vibrate in an uncontrolled manner resulting in cracks and ultimately complete structural failure. As will be apparent from the description and figures that follow, filter assembly 100 is configured to provide a means to package a diesel particulate filter into an exhaust system while providing a way to secure a ceramic based filter element into a metal outer can structure, thereby reducing or eliminating the issues described above.

The filter assembly 100 includes a filter element 102 configured to remove particular matter from an exhaust flow. In one exemplary embodiment, the filter element 102 comprises a ceramic fiber-based media formed into a plurality of pleats. The plurality of pleats are bent into a cylindrical arrangement so as to form alternately opposing inwardly radiating pleated contours 104 forming an inner periphery and outwardly radiating pleated contours 106 forming an outer periphery. The alternately opposing pleated contours thus form a plurality of radially extending elongated channels that axially extend between supporting disks of the filter assembly and a generally cylindrical gas path opening 107 for receiving fluid therethrough.

In one non-limiting exemplary embodiment, filter element 102 comprises a ceramic fiber material, which in accordance with a non-limiting exemplary embodiment of the present invention, is selected from the group consisting of silicon carbide, silicon nitride, cordierite, aluminum oxide, alumina silicate, and combinations thereof.

The filter assembly 100 also includes front and back annular end disks 108, 110 that are formed by a ceramic material, which preferably constitutes fibers and can be formed from a ceramic injection molding or casting process. The end disks 108, 110 are secured to axial ends 112, 114 of the filter element respectively as shown. Conventional techniques, such as by use of an epoxy, thermal bonding, or spin welding, can be used to attach the end disks 108, 110 to axial ends 112, 114 respectively.

The filter assembly 100 includes a collar insert 116 disposed within an opening 118 defined on end disk 108 and a locating dowel or connector 120 disposed within a collar opening 122 defined by collar insert 116 as shown. As such, end disk 108 is closed to form a shield on the front axial end of the filter assembly that blocks the passage of exhaust flow. On the opposite end, end disk 110 includes an opening 124 on the back axial end of the filter assembly that provides a passage for exhaust flow. In one exemplary embodiment, insert 116 is over-molded into end disk 108 by an injection molding or cast molding process. In one alternative exemplary embodiment, a liner of ceramic matting material (as made by Unifrax for DPF and converter matting) can be disposed within opening 122 of end disk 108 to serve as a shock absorber/locating gasket between the dowel and the filter. In one exemplary embodiment, dowel 120 is constructed out of a metal material, such as stainless steel. Of course, other suitable metals or non-metal materials can be used to form dowel 120, such as, for example, ceramic material, which in accordance to one exemplary embodiment is formed by a ceramic injection molding or casting process. In accordance to one exemplary embodiment there is an interference fit between the collar 116 and the dowel 120. In one non-limiting exemplary embodiment, a graphite gasket (not shown) or a ceramic matting material is disposed between opening 122 of collar insert 116 and dowel 120 for mating the dowel 120 to the insert 116. The dowel 120 is configured to provide locating support in at least two directions (e.g. X and Y-axes) when secured to the can housing and allows the filter element to float in the axial direction of the dowel rod indicated by arrow x. In other words, the end disk 108 secured to the filter element can slide along the axial direction of the dowel due to thermal expansion and contraction of the filter element.

In one non-limiting exemplary embodiment, collar insert 116 is formed from a metal material that has a lower thermal expansion coefficient with respect to the filter element. Examples of suitable metal materials for forming collar insert 116 include, but should not be limited to, titanium, stainless, graphite, high chromium gray cast iron, or the like.

In accordance with an exemplary embodiment of the present invention, FIG. 7 illustrates an exemplary embodiment of an exhaust treatment device that incorporates exemplary filter assembly 100 of FIG. 6. Exhaust treatment device 130 may be configured to receive emissions from an exhaust-producing system (not shown) and to remove particulates and gaseous compounds from the emissions before being exhausted into the atmosphere. The exhaust treatment device may include a can housing 132 within which the filter assembly 100 is disposed. In one non-limiting exemplary embodiment, can housing 132 is constructed out of metal, such as stainless steel. Of course, other suitable metals can be used to form the housing 132, such as, for example, cast iron. In one exemplary embodiment, dowel 120 is made out of the same material as can housing 132, typically a grade similar to 304 stainless steel.

In one exemplary embodiment, can housing 132 includes an exhaust inlet 134 configured to receive an exhaust flow from the exhaust-producing system (not shown), an inlet chamber 136, an outlet chamber 138, and an exhaust outlet 140. The housing may have a rectangular cross-sectional shape along its length as shown. It is also contemplated that the housing may have a cross-section shape other than rectangular such as, for example, circular, square, oval, conical, or another appropriate shape.

The inlet may have a substantially circular cross-section. It is also contemplated that the inlet may have a differently shaped cross-section such as oval, square, rectangular, triangular, or any other suitable cross-section. The inlet may project from a first end 142 of the housing in a length direction of the housing as shown. The outlet may have a substantially circular cross-section. It is also contemplated that the outlet may have a differently shaped cross-section such as oval, square, rectangular, triangular, or any other suitable cross-section. The outlet may project from a second end 144 of the housing in the length direction of the housing, opposite the first end 142 as shown. It is contemplated that the inlet and/or the outlet may alternately project from a side of the housing that is orthogonal or tangential to the length direction.

In one exemplary embodiment, the filter assembly 100 is disposed within the housing 132 to extend from the inlet to the outlet in an exhaust gas path indicated by the arrows 143 in FIG. 7. A surface portion of the back end disk 110 is configured to mate with the second end 144 of housing 132. The filter assembly may include a means for matting the back end disk to the second end 144 of housing 132. These means include, but should not be limited to, a ceramic paste, a weld or any other known means. Back end disk 110 is fixedly secured to the second end 144 of housing 132, thus having the filter assembly in a fixed position (in the X, Y, and Z axes) within the housing.

On the opposite end of the filter assembly, one end of dowel 120 is fixedly secured to a surface of the first end 142 of housing 132 as shown in FIGS. 7 and 8 in a manner so that the exhaust gas path indicated by the arrows 143 in FIG. 7 is maintained and axial end 114 of the filter element is fixed in the X, Y, and Z-axes, thus reducing the impact of thermal expansion on filter preload while axial end 112 of the filter element is fixed in at least two axes by the dowel pin. Essentially, by insert molding a cylinder of semi-exotic metal with low thermal expansion coefficient into the filter structure, to provide a boss location for the can-mounted locating dowel pin, a method of supporting the filter in two axes but allowing the filter element to float to absorb the differences in thermal expansion is provided. This method of fixturing can also be used regardless of material selection, or filter type, essentially applicable to any application where vibration and heat effects are issues.

Figure 9:
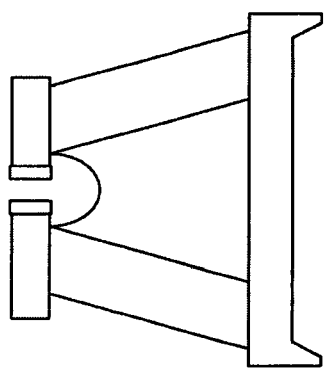
FIG. 9 is a cross-sectional view of an alternative exemplary embodiment of a filter assembly having a conical filter element configuration being in incorporated into the exhaust treatment device in accordance with an exemplary embodiment of the present invention.
Figure 10:
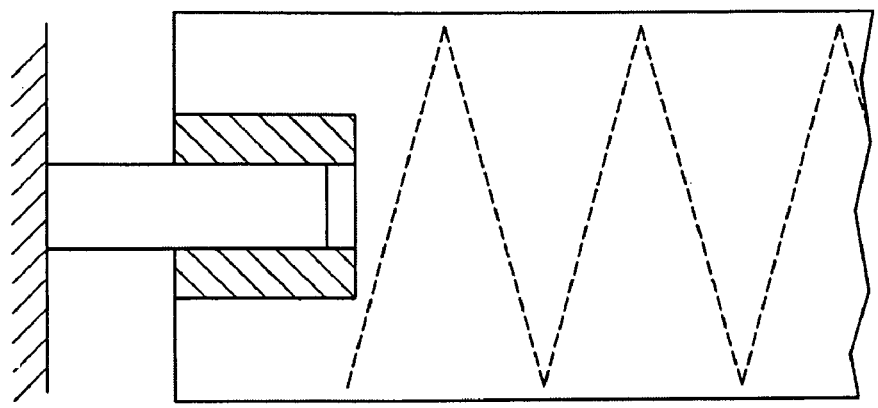
FIG. 10 is a cross-sectional view of an alternative exemplary embodiment of a filter assembly having a flat panel filter element configuration being in incorporated into the exhaust treatment device in accordance with an exemplary embodiment of the present invention.

In accordance with an exemplary embodiment of the present invention, the size and configurations of the end disks and filter elements illustrated in FIGS. 6-8 should be considered as non-limiting examples. It is contemplated that alternative exemplary embodiments of filter assembly 100 could, for instance, include filter elements and end disks being configured differently based on the application. In one alternative exemplary embodiment, filter assembly 100 includes filter elements transversely extending between end disks having different sizes as illustrated in FIG. 9. In other words, an alternative filter assembly can be configured for a conical shaped filter arrangement. In another alternative exemplary embodiment, filter assembly 100 includes a flat panel filter arrangement as illustrated in FIG. 10. In this alternative arrangement, the flat panel filter is secured to a low thermal expansion collar insert that is in an interference fit with a dowel pin fixed to a can housing. Alternatively, a graphite gasket can be disposed between the collar insert and dowel pin. In this embodiment, the flat panel filter floats in the axial direction of the dowel rod indicated by arrow x due to thermal expansion and contraction.

FIGS. 6-10 illustrate examples of alternative arrangements of configuring the filter media of filter assembly 100 and securing the same to a can outer structure in accordance with an exemplary embodiment of the present invention. The number of filter elements, as well as their dimensions and configurations, can be varied and depend on the filtration, size, manufacturing, and other requirements of a particular application.

Accordingly, exemplary embodiments of filter assembly 100 of the present invention relate to means for effectively packaging a diesel particulate filter into an exhaust system while providing a means (like the dowel and insert arrangement) for securing a ceramic based filter element into a metal outer can structure.

An alternative exemplary embodiment of a filter assembly in accordance with an exemplary embodiment of the present invention is illustrated in FIGS. 11-14. As shown, a filter assembly 200 configured to be incorporated into an exhaust treatment device is provided. Because of high strength and large filter media area requirements, as well as packaging (or housing/"canning") constraints, ceramic pleated style diesel particular filters pose a challenge in larger scale applications. As will be apparent from the description and figures that follow, filter assembly 200 is configured to provide a means for packaging diesel particulate filters for larger scale applications, such as for example, locomotive, large over the road vehicles, stationary units, large construction equipment, etc. As will also be apparent from the description and figures that follow, rather than creating one large diesel particulate filter to accommodate larger scale applications, filter assembly 200 will provide a number of smaller, modular diesel particulate filters that can be created and racked together in configurations that provide the necessary strength support and offers more placement and packaging options which in turns leads to greater media area.

Figure 11:
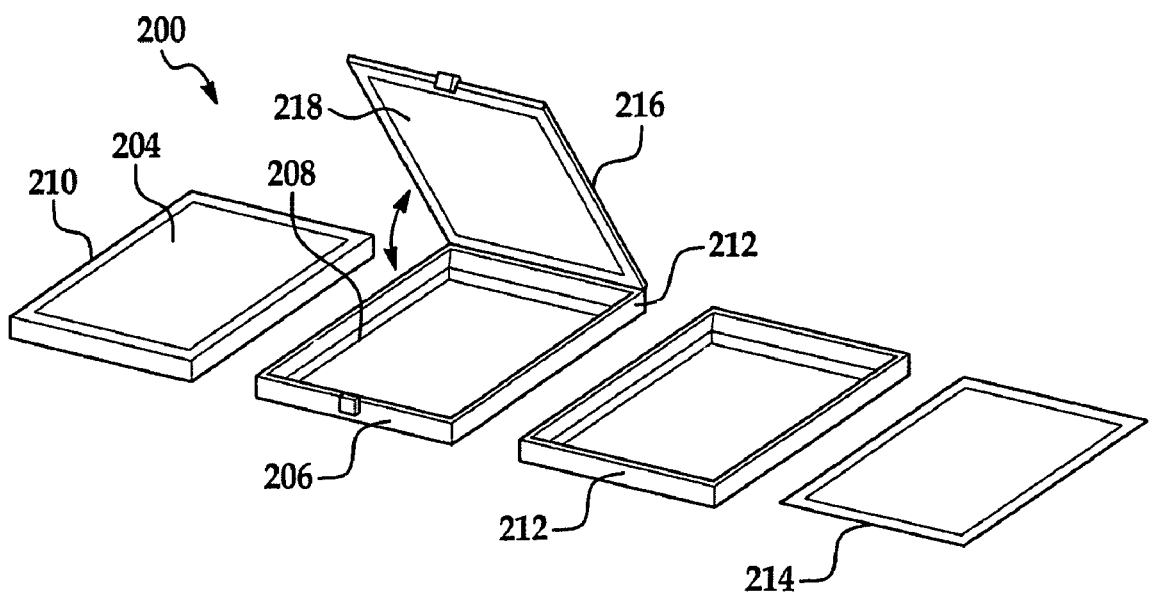
FIG. 11 is a perspective view a single panel filter used to form an alternative exemplary embodiment of a filter assembly in accordance with an exemplary embodiment of the present invention.
Figure 12:
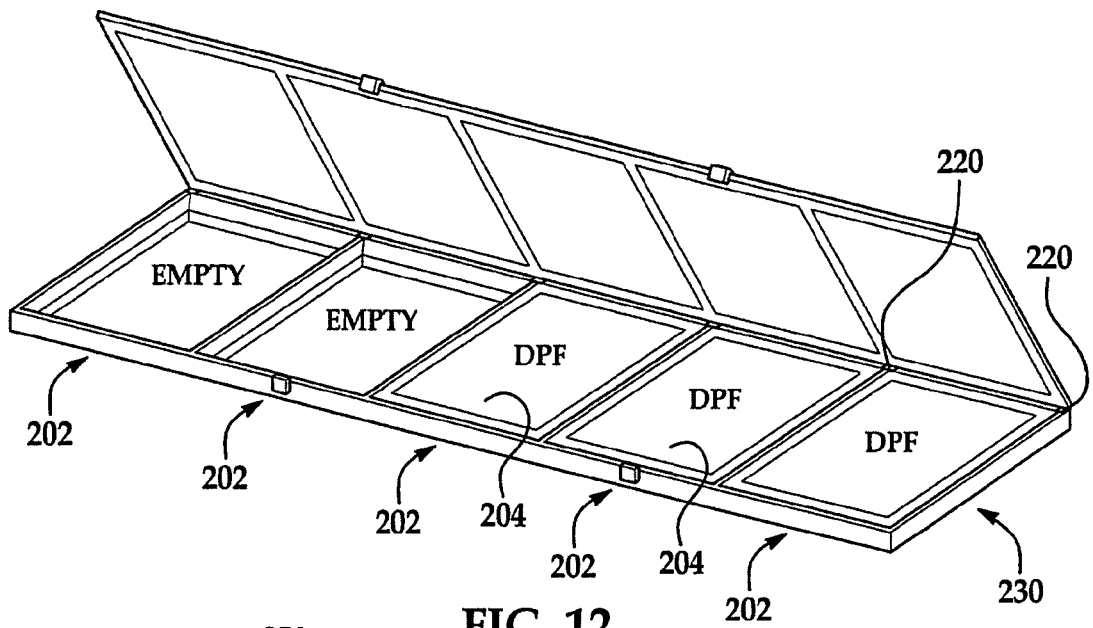
FIG. 12 is a perspective view of a filter rack comprising a plurality of single panel filters used to form an alternative exemplary embodiment of a filter assembly in accordance with an exemplary embodiment of the present invention.

Referring to FIGS. 11 and 12, filter assembly 200 includes a plurality of single panels 202 having filter media 204 configured to remove particulate matter from an exhaust flow. Each of the plurality of single panels 202 comprises a frame or housing 206 defining a perimeter rim 208 for supporting filter media 204, which is surrounded by a ceramic frame 210. The ceramic frame 210 surrounding filter media 204 is disposed within housing 206 and is sealed within housing 206 and to the perimeter rim 208 of the housing a bottom ceramic matting material 212 available from Unifrax or equivalents thereof. Once the ceramic frame 210 is sealed to the perimeter rim 208 of housing 206, a top ceramic matting material 214 (available from Unifrax or equivalents thereof) is used to seal the ceramic frame 210 to the bottom ceramic matting material 212. Other sealing means for sealing the ceramic frame within the housing can be used in accordance with an exemplary embodiment of the present invention, such as, the use of a gasket. This allows for removal of the filter media 204 from the housing 206 to facilitate cleaning wherein the entrained particulates are removed with any suitable process including but should not be limited to sucking or blowing the particulates into a disposal service.

Each plurality of single panels 202 further includes a lid 216 configured to secure the ceramic frame 210 within housing 206. The lid 216 includes an opening 218 configured to receive the exhaust flow. One end of the lid 216 is secured to one end of housing 206 by hinges 220. The lid includes a locking mechanism 222 for securing another end of the lid 216 to another end of housing 206 as shown.

In accordance with an exemplary embodiment of the present invention, the housing is constructed out of a metal material, such as stainless steel. Of course, other suitable metals or non-metals can be used to form housing 206, such as cast iron. In one non-limiting exemplary embodiment, the housing comprises a ceramic material that can be formed by a ceramic injection molding or casting process.

In accordance with an exemplary embodiment of the present invention, the lid is constructed out of a metal material, such as stainless steel. Of course, other suitable metals or non-metals can be used to form housing 206, such as cast iron. In one non-limiting exemplary embodiment, the lid comprises a ceramic material that can be formed by a ceramic injection molding or casting process.

In accordance with an exemplary embodiment of the present invention, a plurality of single panels 202 are secured together by a securing mean for forming a filter rack 230, which forms the filter assembly in accordance with an exemplary embodiment of the present invention. This securing means includes, but should not be limited to, a ceramic paste, a weld or any other known means. The filter rack 230 can include any number of panels secured together in any configuration depending on the application and should not be limited to the example shown in FIG. 12. In one exemplary embodiment, the panels 202 used to form filter rack 230 are molded together as one part using a well-known molding process (e.g. injection molded).

In accordance with an exemplary embodiment of the present invention, filter rack 230 includes panels having filter media, panels without filter media, or a combination of both secured to each other as shown FIG. 12.

In one non-limiting exemplary embodiment, the filter element is disposed within and supported by the ceramic frame, and comprises a ceramic fiber material, which in accordance with non-limiting exemplary embodiments of the present invention, is selected from the group consisting of silicon carbide, silicon nitride, cordierite, aluminum oxide, alumina silicate, and combinations thereof. In accordance with an exemplary embodiment of present invention the ceramic frame and/or the ceramic media can be formed by a ceramic injection molding or casting process.

Figure 13:
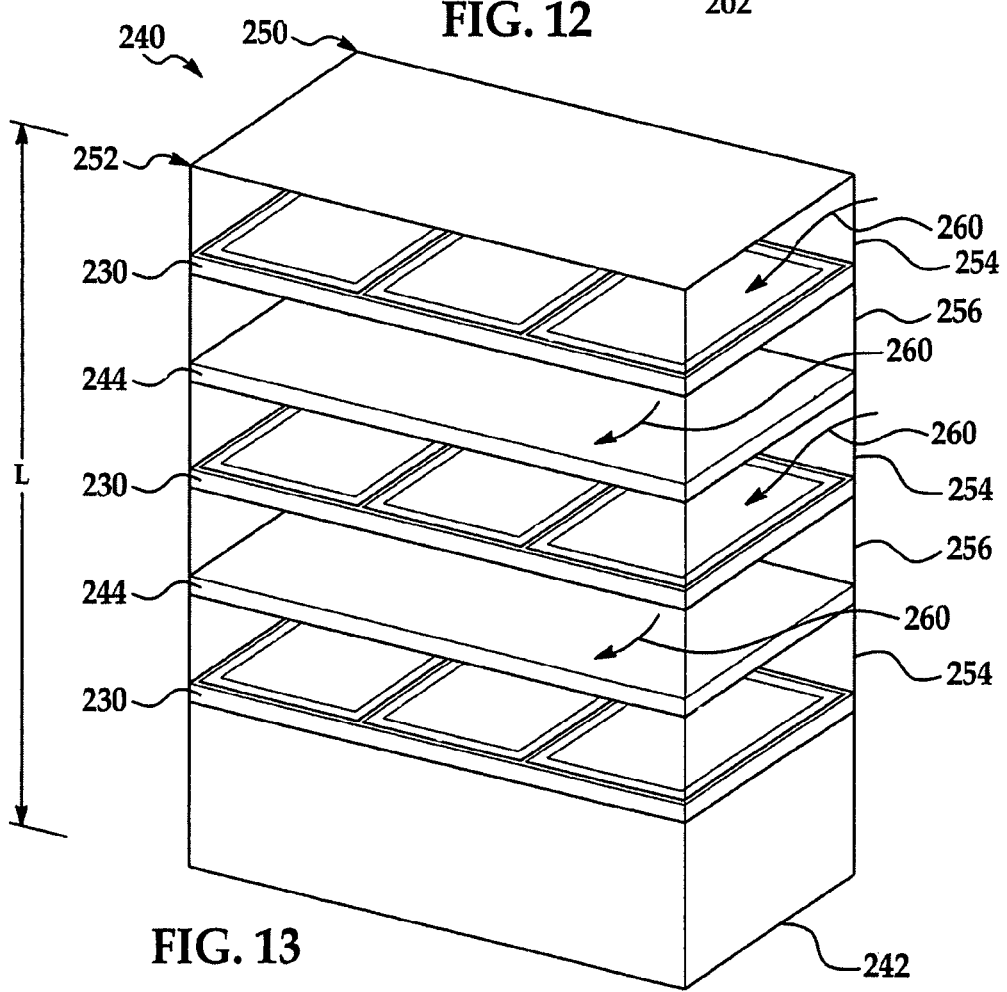
FIG. 13 is a cross-section view of another exhaust treatment device with a housing for incorporating a plurality of filter racks and dividers in an alternating manner and forming an alternative exemplary embodiment of a filter assembly in accordance with an exemplary embodiment of the present invention.

In accordance with an exemplary embodiment of the present invention, FIG. 13 illustrates an exemplary embodiment of an exhaust treatment device that incorporates exemplary filter rack 230 of FIG. 12 for forming the filter assembly. Exhaust treatment device 240 may be configured to receive emissions from an exhaust-producing system (not shown) and to remove particulates and gaseous compounds from the emissions before being exhausted into the atmosphere. The exhaust treatment device may include a can housing 242 within which one or more filter racks 230 and filter dividers 244 are disposed. In one non-limiting exemplary embodiment, can housing 242 is constructed out of metal, such as stainless steel. Of course, other suitable metals or non-metals can be used to form housing 242, such as, for example, ceramic material, which in accordance to one exemplary embodiment is formed by a ceramic injection molding or casting process. The housing 242 may have a substantially rectangular cross-section. It is also contemplated that the housing may have a differently shaped cross-section such as circular, square, triangular, or any other suitable cross-section shapes.

In accordance with one exemplary embodiment of the present invention, a plurality of filter racks 230 are secured to an inner surface of housing 242 and evenly spaced apart from each other along the length (L) of the housing by a desired distance. Each filter rack extends laterally within housing 242. In one exemplary embodiment, a plurality of filter racks 230 and a plurality of dividers 244 are arranged within the housing 242 in an alternating manner as shown.

In accordance with an exemplary embodiment and as illustrated in FIG. 13, housing 242 includes an inlet side 250 and an outlet side 252. The inlet side 250 and outlet side 252 each include openings 254 that are alternately arranged with closed ends 256, thus forming a plurality of fluid flow paths illustrated by arrows 260 between the inlet and outlet side of the housing.

Figure 14:
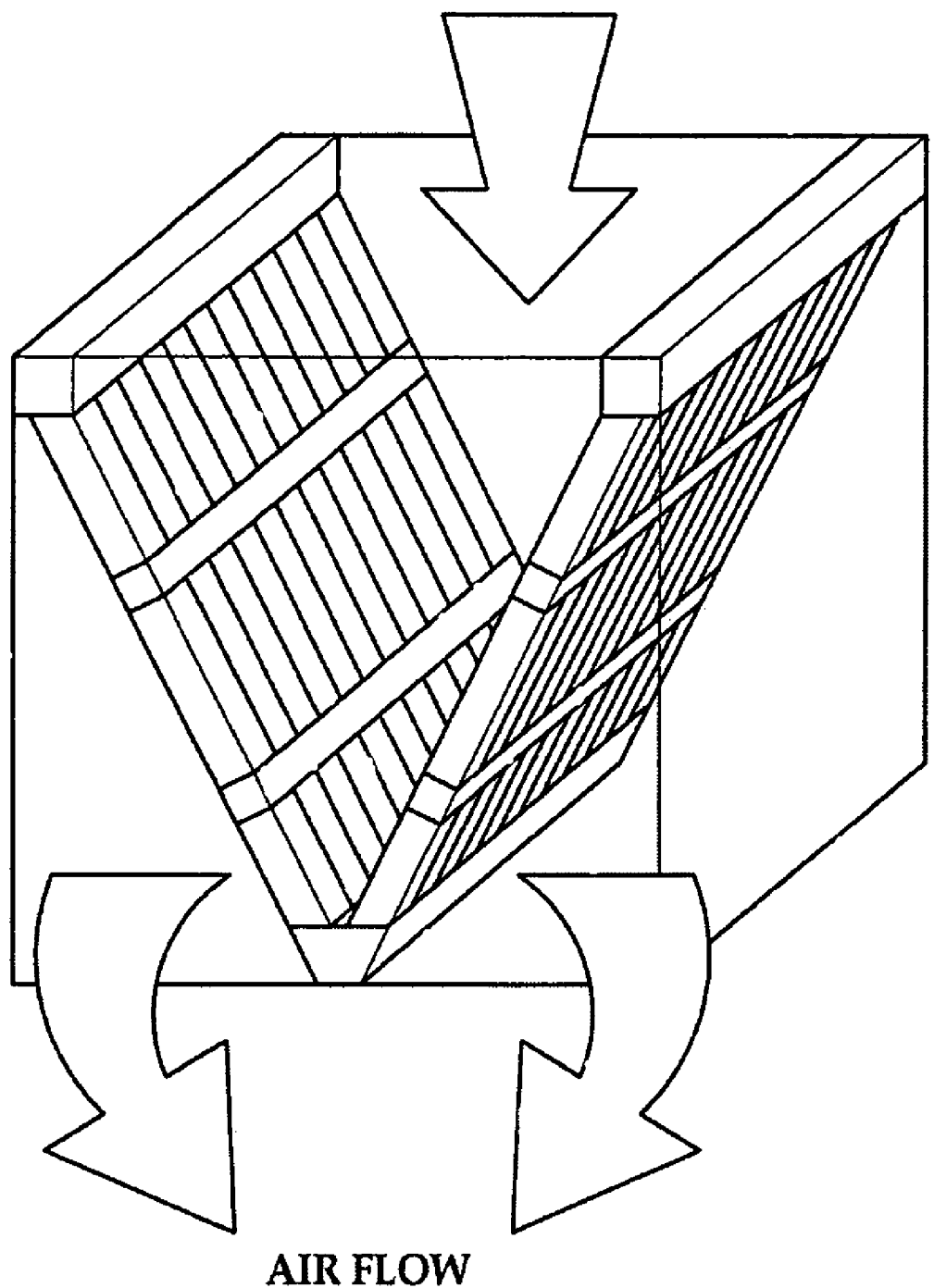
FIG. 14 is illustrates an alternative exemplary embodiment of a filter assembly in accordance with an exemplary embodiment of the present invention.

In accordance with an exemplary embodiment of the present invention, housing 242 can include any number of filter racks created in various configurations that can be racked together along with filter dividers in any configuration within the housing for forming a high strength and large filter media area for larger scale applications. An example of a different configuration in accordance with an alternative exemplary embodiment of the present invention is illustrated in FIG. 14 in which the racks and/or dividers can be configured to converge within the housing as shown.

Accordingly, exemplary embodiments of filter assembly 200 of the present invention relate to means for creating a number of smaller, modular diesel particulate filters and racking them together in configurations that provide the necessary strength support, offer more placement and packaging options which in turn leads to greater media area.

In accordance with an exemplary embodiment of the present invention, the number and configurations of the racks and dividers illustrated in FIGS. 11-13 should be considered as non-limiting examples. It is contemplated that alternative exemplary embodiments of filter assembly 200 could, for instance, include any number of racks and dividers having any number of configurations within a housing that is in fluid communication with an exhaust-producing system.

In addition to the exemplary embodiments described above, exemplary filter assemblies in accordance with the present invention can be formed into many other geometries by varying the number and dimensions of the pleated filter media elements, such as by stacking or banking together elements together, to suit a particular applications of the dimensions of a particular housing canister. Examples of other shapes that can be utilized for the pleated filter elements to meet a particular exhaust manufacturer's requirements can include flat, round, rectangular, panel, conical, and oval, as well as other appropriate shapes. Therefore, a filter assembly in accordance with the present invention is not limited by dimensional requirements for conventional wall-flow filters. This packaging flexibility allows for a filter assembly to be configured with a preferred geometry for lower-cost assembly and lower-cost installation into a particular housing canister, as well as to have a tight-fit in a fixed position within a particular housing canister for improved durability. For example, a filter assembly can be configured to have a geometry that is suitable for use in a housing canister in which closely packed pleats are required due to size limitations imposed by the environment in which the exhaust treatment device is to be employed.

Filter assembles employing depth filtration can enable exhaust treatment devices to remove diesel particulate matter at high filtration efficiency and a fraction of the backpressure of conventional wall-flow monolithic filters, thereby increasing the efficiency of the engine and decreasing fuel consumption. Exemplary embodiments of filter assemblies in accordance with the present invention can be employed to further increase filtration efficiency and reduce backpressure beyond a conventional depth filter assemblies. Moreover, exemplary embodiments of filter assemblies in accordance with the present invention weigh significantly less than conventional wall-flow filters, can provide lower thermal mass and higher soot-loading capacity, and can accommodate higher exhaust flow rates. The lower thermal mass, in particular, further reduces fuel consumption by achieving soot combustion temperatures more quickly, thereby requiring less auxiliary energy for filter cleaning.

Moreover, exemplary embodiments of filter assemblies in accordance with the present invention employ filter elements having a simple pleated design. Thus, the pleated filter elements can be manufactured in high-volume using established processes, such as those utilizing an inorganic binder. In preferred embodiments, the pleated filter elements can have a media thickness of 0.05-0.080" and a pleat height of 1-3". Exemplary pleated filter elements of the present invention can be constituted of a ceramic fiber material such as, for example, one comprising silicon carbide. Ceramic fibers, such as those described in U.S. Pat. No. 5,087,272, those described in U.S. Pat. No. 4,873,069, aluminum oxide fibers from Saffil of Berwyn, Pa., alumina silicate fibers from Thermal Ceramics of Augusta, Ga., or combinations thereof, are suitable for inclusion in a filter element of the present invention. Following formation of the ceramic fiber-based web, the fibers can be treated with a binder assist agent, dried, and at least partially bonded to neighboring fibers using the inorganic, preferably ceramic, binder. The typical filter element can include from about 2 to about 7 layers of depth filter media. The use of multiple media layers can increase the soot capacity of a filter module by overcoming the plugging that occurs in the top 20-30% of a single layer media, thereby enabling greater soot penetration and reducing regeneration frequency.

Exemplary embodiments of filter assemblies in accordance with the present invention may be applicable to an exhaust treatment device used for any combustion-type system such as, for example, an engine, a furnace, or any other system known in the art where the removal of gaseous compounds and/or particulate matter from an exhaust flow is desirable. It is also contemplated that such filter assemblies may be used with a non-combustion type system such as, for example, a dust collection system.

In accordance with exemplary embodiments of the present invention a pleated ceramic particulate filter for diesel exhaust systems is provided wherein the pleated ceramic particulate filter reduces the system back pressure, increases fuel efficiency, provides a weight reduction, increases durability of the diesel particulate filter and offers greater packaging flexibility over current monolithic style filters.

The pleated ceramic filter media itself offers a lower initial system restriction over current monolithic style filters due to the media style and filter geometry. In addition, and because diesel particulate filters are a non-serviceable part they must be frequently regenerated to burn away the soot particulate that has collected. The pleated ceramic diesel particulate filter offers a lower thermal mass than the current monolithic style filters, which in turn requires less fuel consumption to regenerate. In addition, and because of its pleated style geometry the pleated diesel particulate filter has a much lower mass than the honeycomb style monolithic diesel particulate filter for a given volume. In addition, and because of its lower relative mass and geometry differences the pleated ceramic style filter will not be subject to the same thermal gradients as a monolithic style filter during regeneration periods. In addition, the pleated ceramic style diesel particulate filter can be formed into different geometries (e.g., round, panel conical, oval, etc.). Additionally, the pleated ceramic diesel particulate filters can in one alternative exemplary embodiment be standardized and banked together in racks for greater media area.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A filter assembly configured to be incorporated within a housing of an exhaust treatment device, the filter assembly comprising:
    a first end disk and a second end disk;
    a filter element secured to the first end disk and the second end disk, the second end disk being secured to a portion of the housing, wherein the second end disk has a central opening; and
    a connector secured to the housing at one end and slideably received within a collar secured to the first end disk, wherein the collar is secured to a central opening of the first end disk by a molding process and wherein the central opening of the first end disk is sealed by the collar and the connector secured thereto such that first end disk is closed to form a shield on a front axial end of the filter assembly and wherein the filter element is capable of expansion and contraction as the first end disk slides with respect to the connector;
    wherein the first end disk, the second end disk and the filter element are each formed from a ceramic material and wherein the collar is formed from a metal material having a lower coefficient of expansion with respect to the filter element.

2. The filter assembly as in claim 1, wherein the first end disk and second end disk are formed by a ceramic injection molding process.

3. The filter assembly as in claim 1, wherein the first end disk and second end disk are formed by a casting process.

4. The filter assembly as in claim 1, wherein the metal material is selected from the group consisting of titanium, stainless, graphite, high chromium gray cast iron, and combinations thereof.

5. The filter assembly as in claim 1, wherein the filter element comprises a ceramic fiber material.

6. The filter assembly as in claim 5, wherein the ceramic fiber material is selected from the group consisting of silicon carbide, silicon nitride, cordierite, aluminum oxide, aluminia silicate, and combinations thereof.

* * * * *